United States Patent [19]

Kimball

[11] 4,440,026
[45] Apr. 3, 1984

[54] VIBRATION APPARATUS WITH FLEXURE MEANS

[76] Inventor: David V. Kimball, 132 W. Chestnut, Monrovia, Calif.

[21] Appl. No.: 422,972

[22] PCT Filed: Mar. 23, 1982

[86] PCT No.: PCT/US82/00349

§ 371 Date: May 4, 1982

§ 102(e) Date: May 4, 1982

[87] PCT Pub. No.: WO83/03370

PCT Pub. Date: Oct. 13, 1983

[51] Int. Cl.³ .............................................. G01N 29/04
[52] U.S. Cl. .................................. 73/663; 73/665; 403/50; 403/223
[58] Field of Search .................. 73/662, 663, 665–668; 367/75, 189; 181/116, 121; 403/50, 223

[56] References Cited

U.S. PATENT DOCUMENTS

| 3,318,139 | 5/1967 | Crook | 73/668 |
| 3,933,033 | 1/1976 | Kimball | 73/665 |
| 4,011,749 | 3/1977 | Cappel | 73/665 |
| 4,265,123 | 5/1981 | Cappel | 73/663 |
| 4,270,390 | 6/1981 | Kimball et al. | 73/663 |

Primary Examiner—Howard A. Birmiel
Attorney, Agent, or Firm—Wagner & Bachand

[57] ABSTRACT

A torsionally stiff flexure support for the slip plate in a vibration apparatus is provided permitting predetermined linear motion along the axis of vibration by longitudinal bending of the flexure, but by virtue of its torsional stiffness blocking pivoting movement about the center axis of the slip plate.

16 Claims, 3 Drawing Figures

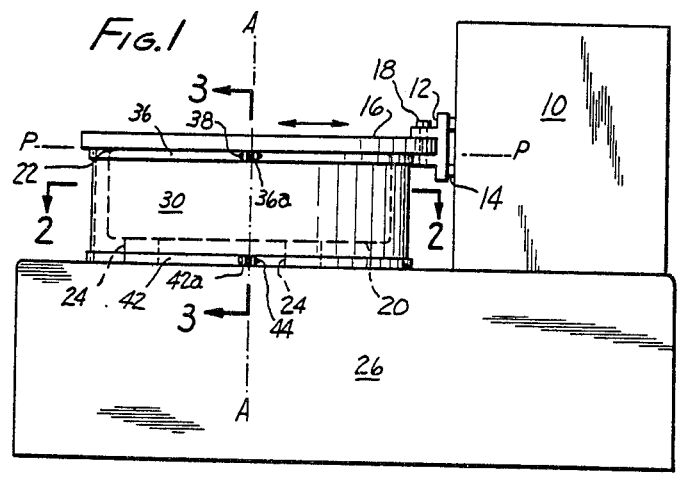
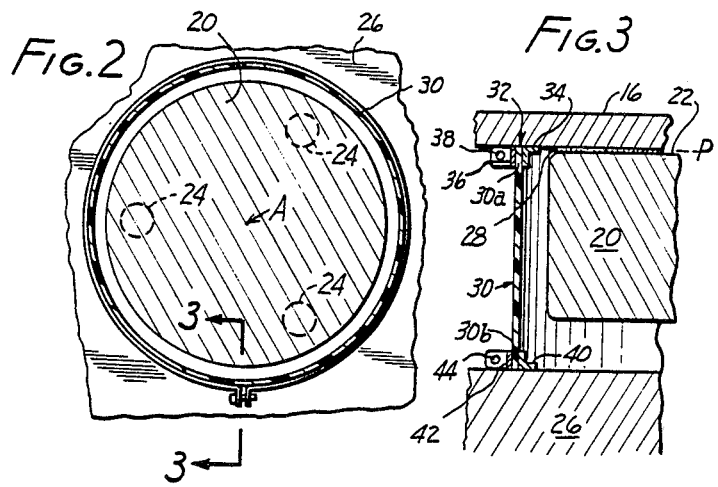

VIBRATION APPARATUS WITH FLEXURE MEANS

TECHNICAL FIELD

This invention has to do with vibration apparatus such as is used in the screening or testing of assembled devices and components thereof, particularly mechanical, electromechanical and electronic devices and components for defects in design or manufacturing. More particularly, the invention is concerned with improvements in vibration apparatus used for screening or testing enabling vibratory shaking of a slip plate without pivoting movement about the shaker axis of engagement with its support block.

BACKGROUND ART

It is known in the art to couple a vibration shaker to a slip plate supported on a support block, typically of polished granite on which there is a thin oil film maintained, and to oscillate the slip plate in one or another predetermined direction by operation of the shaker. The direction of vibratory movement is critically maintained for test validity. The slip plates are limited in their freedom of movement to have a definite response to shaker driving, e.g. by the use of rails, channels, or other guiding devices such as linkages. Such expedients do not permit driving of the slip plate in two axes simultaneously, or only with the need simultaneously to drive through angles and with added mass.

DESCRIPTION OF THE INVENTION

It is therefore an object of the invention to provide apparatus for the vibration screening or testing of assemblies an components, particularly those usefully tested in two axial directions simultaneously. It is another object to provide for use with the usual shaker, slip plate and support block apparatus a novel means of blocking pivoting movement of the slip plate about its center axis, while full permitting linear movement along the predetermined axis or axes of movement. It is a specific object to provide a flexure adapted to constrain aslip plate to which it is connected to move linearly by longitudinal bending of the flexure, while blocking pivoting movement of the slip plate by the torsional stiffness of the flexure.

These and other objects of the invention to become apparent hereinafter, are realized in accordance therewith in vibration apparatus in which a shaker is coupled to a test piece-carrying, single plane universally movable, rigid slip plate and drives the slip plate in axially predetermined sliding engagement with a slip plate support block, by the provision therein of flexure means blocking pivoting movement of the slip plate about its center axis normal to the plane, in slip plate predetermined axial movement permitting relation.

In particular embodiments: the flexure means has a locus of engagement with the slip plate in the plane of slip plate sliding engagement with the support block; the flexure means surrounds the slip plate support block at its locus of engagement with the slip plate; the flexure means locus of engagement with the slip plate is circular; the flexure means is circular in cross-section and axially elongated, the flexure means being fixed to a relatively immovable mass at one end and secured to the slip plate remote to the fixed end, whereby the flexure means bends longitudinally in slip plate predetermined axial movement permitting relation, the flexure means further being torsionally stiff in pivoting slip plate movement blocking relation.

Preferably, the flexure means comprises a longitudinally bendable, torsionally stiff cylinder of synthetic organic plastic, is a hollow cylinder, and the apparatus further includes circularly distributed means connecting the cylinder at one end to the slip plate.

The foregoing and other embodiments of the invention, may further include a vibration shaker and a slip plate.

In a particularly preferred embodiment, the invention contemplates in vibration apparatus in which a shaker is coupled to a test piece-carrying, single plane universally movable, rigid slip plate and drives the slip plate in axially predetermined sliding engagement with a slip plate support block, the provision of a cylindrical flexure blocking pivoting movement of the slip plate about its center axis normal to that plane, in slip plate predetermined axial movement permitting relation.

The mentioned cylindrical flexure typically has a circular locus of engagement with the slip plate in the plane of slip plate sliding engagement with the support block, and surrounds the support block at its locus of engagement with the slip plate. Further, the cylindrical flexure is of uniform diameter along its axial length and fixed at one end to a relatively immovable mass and secured at its opposite end to the slip plate, the flexure being hollow and having a wall thickness adapted to bend longitudinally in slip plate predetermined axial movement permitting relation, the flexure means further being torsionally stiff in pivoting slip plate movement blocking relation. As in the previous embodiment, the flexure means comprises a longitudinally bendable, torsionally stiff cylinder of synthetic organic plastic.

There is typically further provided circularly distributed means carried by the slip plate within the cylindrical flexure, and clamping means clamping the one end of the flexure to the circularly distributed means to connect the flexure to the slip plate.

The flexure is typically combined with a vibration apparatus comprising a vibration shaker and a slip plate.

Thus, in a particularly preferred embodiment, the invention provides, vibration apparatus comprising a vibration shaker, a slip plate adapted to be driven in predetermined axial vibratory movement by the shaker, a slip plate support block having sliding engagement with the slip plate, a cylindrical flexure longitudinally bendable but torsionally stiff and fastened at one end to a relatively immovable mass and clamped at the opposite end to an inwardly disposed flange ring carried by the slip plate by a clamp acting circularly of the flexure end to block slip plate pivoting movement about its axis of engagement with the support block, the flexure surrounding the support block.

The invention further provides, method for effecting vibration testing of a test piece carried on a rigid slip plate, which includes vibrating the slip plate in a predetermined axial direction while constraining the slip plate for linear movement only by securement to a longitudinally bendable, torsionally stiff flexure.

THE DRAWINGS

The invention will be further described as to an illustrative embodiment in conjunction with the attached drawings in which:

FIG. 1 is a side elevation view of vibration apparatus according to the invention;

FIG. 2 is a horizontal sectional view thereof, taken on line 2—2 in FIG. 1: and, FIG. 3 is a fragmentary vertical sectional view, taken on line 3—3 in FIG. 1.

PREFERRED MODES

Turning now the drawings in detail, in FIG. 1 vibration shaker 10 is an armature and field coil apparatus in a metal housing. A driver bar 12 carried on the shaker armature 14 is coupled to a rigid, horizontally disposed magnesium, or other suitable metal slip plate 16, on which a test piece (not shown) is carried for vibratory testing. Slip plate 16 coupling to the driver bar 12 is by a series of vertically disposed expansion bolts 18 which transmits the vibration of the shaker 10 armature and field coil arrangement to the slip plate.

With reference to FIGS. 1, 2 and 3, the slip plate 16 is vertically supported on a granite slip plate support block 20 having a polished surface 22. The slip plate support block 20 is supported on steel supports 24 anchored in a concrete and steel mass 26. An oil film 28 is maintained atop support block surface 22 to facilitate sliding of the slip plate 16 in engagement with the surface. As will be noted below, oil film bearing tables have in the past subjected their surroundings to oil contamination, but with the present flexure apparatus, the oil is completely contained within the apparatus.

The apparatus as thusfar described has a slip plate 16 driven by shaker 10 relative to support block 20. Vibration is preferably linear along a predetermined axis, in the drawings left-to-right and back, as determined by the axis of movement of the armature 14 in shaker 10. In the normal course of operation, however, the slip plate 16 may tend to deviate from a straight line and to describe skewed movements, and also to pivot partially with respect to the center vertical axis A—A of the slip plate 16 engaged with the support block 20. Such movements are detrimental to effective testing and evaluation of components and assemblies.

It is a signal feature of the present invention that nonlinear, or pivoting movements are blocked, while linear movement is permitted, all with a simple cylinder flexure indicated at 30. The flexure 30 is a hollow cylinder diametrically dimensioned to surround the support block 20 and of an axial length to extend from a circular locus of engagement 32 with the underside of the slip plate 16, in the plane P—P at which the slip plate engages the support block surface 22. The flexure 30 is circular in cross-section to be resistant to torsional force. That is, the flexure 30 is a cylinder and has a wall thickness sufficient, given the material of construction, to be stiff in torsion, but yet, not so thick in the wall as to resist unduly longitudinal bending, i.e. bending on the axis A—A. Solid synthetic organic plastic walls, e.g. of polyolefin, polyamide, polyester, or the like, preferably having a very high tensile strength, e.g. 35,000 psi. and above, and high flexural strength and toughness to resist fatigue failure, are suitable. The flexure 30 wall may be corrugated, as in a bellows, to ease flexing stress.

The flexure 30 is connected to the slip plate 16 by fitting the upper end of the flexure over a flanged ring 34 which is secured to the slip plate by fasteners not shown. A clamp 36 of the hose-clamp type is tightened over the top edge margin 30a of the flexure 30 by bolt 38 through ears 36a until the flexure is snugly against the flanged ring 34, as shown. At the lower end of the flexure 30, opposite the slip plate end, the flexure lower edge margin 30b is secured to a second flanged ring 40 by clamp 42 and bolt 44 through ears 42a, as shown. The support block 20, and its oil film 28 are fully enclosed against oil contamination in the areas beyond the apparatus.

In operation, the slip plate 16 is driven essentially on a single axis in plane P—P, the axis of driving being predetermined by the alignment of the armature 14. In the event of the onset of pivoting motion about the vertical axis A—A, the flexure 30 which because of its ability to bend longitudinally has accommodated the linear movement of the slip plate and thus permitted driving in the predetermined axis, is twisted on its own longitudinal axis, in torsion. But because the cylinder is uniform and circular in cross-section, and trapped between slip plate 16 and mass 26, as described, only twisting will allow pivoting movement of the slip plate, but the cylindrical flexure is torsionally stiff. The result is that the pivoting moment imparted to the slip plate 16 is substantially converted to linear movement of the slip plate. Pivoting movement is blocked, linear movement permitted in a simple reliable manner, meeting the foregoing objectives of the invention.

I claim:

1. In vibration apparatus in which a shaker is coupled to a rigid slip plate carrying a test piece to be universally movable in a single plane and drives said slip plate in axially predetermined sliding engagement with a slip plate support block, flexure means blocking pivoting movement of said slip plate about its center axis normal to said plane, said flexure means being longitudinally bendable responsive to slip plate movement while blocking said pivoting movement, to permit said predetermined axial movement.

2. Vibration apparatus according to claim 1, in which said flexure means has a locus of engagement with said slip plate in the plane of slip plate sliding engagement with said support block.

3. Vibration apparatus according to claim 2, in which said flexure means surrounds said slip plate support block at its locus of engagement with said slip plate.

4. Vibration apparatus according to claim 3, in which said flexure means locus of engagement with said slip plate is circular.

5. Vibration apparatus according to claim 1, in which said flexure means is circular in cross-section and axially elongated, said flexure means being fixed to a relatively immovable mass at one end and secured to said slip plate remote to said fixed end, whereby said flexure means bends longitudinally in slip plate predetermined axial movement permitting relation, said flexure means further being torsionally stiff in pivoting slip plate movement blocking relation.

6. Vibration apparatus according to claim 1, in which said flexure means comprises a longitudinally bendable, torsionally stiff cylinder of synthetic organic plastic.

7. Vibration apparatus according to claim 6, in which said flexure means is a hollow cylinder, and including also circularly distributed means connecting said cylinder at one end to said slip plate.

8. Vibration apparatus according to claim 1, including also a vibration shaker and a slip plate.

9. In vibration apparatus in which a shaker is coupled to a rigid slip plate carrying a test piece to be universally movable in single plane and drives said slip plate in axially predetermined sliding engagement with a slip plate support block, a cylindrical flexure longitudinally bendable responsive to said slip plate to permit predetermined axial movement thereof and block pivoting movement of said slip plate about its center axis normal to said plane.

10. Vibration apparatus according to claim 9, in which said cylindrical flexure has a circular locus of engagement with said slip plate in the plane of slip plate sliding engagement with said support block, and surrounds said support block at its locus of engagement with said slip plate.

11. Vibration apparatus according to claim 10, in which said cylindrical flexure is of uniform diameter along its axial length and fixed at one end to a relatively immovable mass and secured at its opposite end to said slip plate, said flexure being hollow and having a wall thickness adapted to bend longitudinally in slip plate predetermined axial movement permitting relation, said flexure means further being torsionally stiff in pivoting slip plate movement blocking relation.

12. Vibration apparatus according to claim 11, in which said flexure means comprises a longitudinally bendable, torsionally stiff cylinder of synthetic organic plastic.

13. Vibration apparatus according to claim 11, including also circularly distribued means carried by said slip plate within said cylindrical flexure, and clamping means clamping said one end of the flexure to said circularly distributed means to connect said flexure to said slip plate.

14. Vibration apparatus according to claim 13, including also a vibration shaker and a slip plate.

15. Vibration aparatus comprising a vibration shaker, a slip plate adapted to be driven in predetermined axial vibratory movement by said shaker, a slip plate support block having sliding engagement with said slip plate, a cylindrical flexure longitudinally bendable but torsionally stiff and fastened at one end to a relatively immovable mass and clamped at the opposite end to an inwardly disposed flange ring carried by said slip plate by a clamp acting circularly of said flexure end to block slip plate pivoting movement about its axis of engagement with said support block, said flexure surrounding said support block.

16. Method for effecting vibration testing of a test piece carried on a rigid slip plate, which includes vibrating said slip plate in a predetermined axial direction while constraining said slip plate for linear movement only by securement to a longitudinally bendable, torsionally stiff flexure.

* * * * *